United States Patent [19]

Makino et al.

[11] Patent Number: 4,474,662
[45] Date of Patent: Oct. 2, 1984

[54] PROCESS FOR PRODUCING POROUS AROMATIC POLYIMIDE MEMBRANES

[75] Inventors: Hiroshi Makino; Yoshihiro Kusuki; Takashi Harada; Hiroshi Shimazaki; Tosio Isida, all of Ichihara, Japan

[73] Assignee: Ube Industries, Ltd., Ube, Japan

[21] Appl. No.: 368,027

[22] Filed: Apr. 13, 1982

[30] Foreign Application Priority Data

Apr. 13, 1981 [JP] Japan .................................. 56-54967

[51] Int. Cl.$^3$ ............................................. B29D 27/04
[52] U.S. Cl. .................................. 210/500.2; 55/158; 264/41; 264/53; 521/64
[58] Field of Search ................. 264/41, 53; 210/500.2, 210/490; 55/16, 158; 521/64

[56] References Cited

U.S. PATENT DOCUMENTS

| | | | |
|---|---|---|---|
| 3,822,202 | 7/1974 | Hoehn | 55/16 |
| 4,240,914 | 12/1980 | Iwama et al. | 264/41 X |
| 4,262,094 | 4/1981 | Johnson | 264/41 X |
| 4,272,467 | 6/1981 | Johnson | 264/41 |
| 4,358,378 | 11/1982 | Iwama et al. | 264/41 X |
| 4,378,324 | 3/1983 | Makino et al. | 264/41 |
| 4,378,400 | 3/1983 | Makino et al. | 55/158 X |
| 4,385,084 | 5/1983 | Iwama et al. | 264/41 X |

*Primary Examiner*—Philip E. Anderson
*Attorney, Agent, or Firm*—Burgess, Ryan & Wayne

[57] ABSTRACT

A porous membrane of an aromatic polyimide having an enhanced permeability of a gas or liquid is produced by a process comprising the steps of (1) preparing a dope solution of 3 to 30% by weight of an aromatic polyimide in a mixed solvent of (A) 100 parts by weight of a base solvent capable of dissolving 5% by weight or more of the polymeric acid and of evaporating at 30° C. to 400° C. and (B) 5 to 150 parts by weight of an additional liquid not capable of dissolving 3% by weight or more of the polyamic acid and capable of evaporating at a smaller evaporating rate than that of the base solvent at the above-mentioned evaporating temperature;

(2) forming a thin layer of the dope solution at 0° C. to 120° C.; and (3) heating the dope solution layer at 30° C. to 400° C. so as to evaporate off the mixed solvent and to convert the polyamic acid to the corresponding polyimide.

12 Claims, No Drawings

PROCESS FOR PRODUCING POROUS AROMATIC POLYIMIDE MEMBRANES

FIELD OF THE INVENTION

The present invention relates to a process for producing a porous aromatic polyimide membrane. More particularly, the present invention relates to a process for producing a porous aromatic polyimide membrane from a polyamic acid by using a specific solvent.

The porous polyimide membrane prepared in accordance with the process of the present invention exhibits an excellent gas- and liquid-separating property, excellent heat-resistance, a superior resistance to chemicals and satisfactory mechanical properties. Accordingly, the porous polyimide membrane produced in accordance with the present invention can be advantageously used for separation and concentration of a gas mixture, for example, a hydrogen-carbon monoxide gas mixture, or a liquid mixture. The porous polyimide membrane may be in the form of a flat film or a hollow fiber.

BACKGROUND OF THE INVENTION

It is well known that an aromatic polyimide membrane or film can be produced from a dope solution of a polyamic acid, which solution has been prepared by the polymerization reaction of an aromatic tetracarboxylic acid component with an aromatic diamine component in an organic polar solvent, by spreading the dope solution on a smooth surface of a film-forming device to form a thin layer of the dope solution and, then, by evaporating the solvent from the dope solution layer while converting the polyamic acid to the corresponding polyimide, so as to form a thin solid film of the polyimide. This process has been actually utilized in industry.

However, it is also known that the conventional dense membrane consisting of the aromatic polyimide exhibits a remarkably poor permeating rate of a gas or liquid. Therefore, the conventional aromatic polyimide membrane can not be used as a separator for a gas mixture or a liquid mixture or as a concentrator of a gas or liquid, unless the membrane is made very thin. The conventional process can not provide a thin porous aromatic polyimide membrane having a satisfactory permeating rate for a gas or liquid.

Under the above-mentioned circumstances, it was strongly desired to provide a new process for producing an aromatic polyimide membrane from a polyamic acid said membrane having a porous structure and exhibiting an enhanced permeating rate of a gas or liquid therethrough which is useful as a separator of a gas or liquid mixture or as a concentrator of a gas or liquid.

SUMMARY OF THE INVENTION

An object of the present invention is to provide a process for producing a porous aromatic polyimide membrane having a satisfactory permeating rate of a gas or liquid therethrough from a corresponding polyamic acid.

Another object of the present invention is to provide a process for producing a porous aromatic polyimide membrane useful as a separator of a gas or liquid mixture and as a concentrator of a gas or liquid.

The above-mentioned objects can be attained by the process of the present invention which comprises the steps of:

(1) dissolving 3 to 30% by weight of an aromatic polyamic acid which has been prepared by the polymerization of at least one aromatic tetracarboxylic acid component with at least one aromatic diamine component, in 70 to 97% by weight of a solvent consisting essentially of a homogeneous mixture of:

(A) 100 parts by weight of a base solvent, consisting essentially of at least one polar organic compound which base solvent is capable of dissolving therein the polymeric acid in a concentration of 5% by weight or more therein, and of evaporating at a temperature of from 30° to 400° C., and (B) 5 to 150 parts by weight of an additional liquid consisting essentially of at least one polar organic compound, which additional liquid is not capable of dissolving therein 3% by weight or more of the polyamic acid and is capable of evaporating at a smaller evaporating rate than that of the base solvent at the above-mentioned evaporating temperature, to provide a dope solution;

(2) forming a thin layer of the dope solution at a temperature of from 0° to 120° C.; and (3) heating said thin layer of the dope solution at a temperature of from 30° to 400° C., whereby the mixed solvent is gradually evaporated off from the thin layer of the dope solution and the polymeric acid is imidized to a corresponding polyimide, to form a porous membrane of the polyimide.

DETAILED DESCRIPTION OF THE INVENTION

In the process of the present invention, it is important that an aromatic polyamic acid to be converted to a corresponding aromatic polyimide is dissolved in a specific solvent mixture of a base solvent and an additional liquid to provide a dope solution. The dope solution is usable for producing a porous membrane of the aromatic polyimide by forming a thin layer of the dope solution and by heating the thin layer, so as to evaporate the solvent mixture and to convert the aromatic polyamic acid to the corresponding aromatic polyimide. The process of the present invention is effective for producing a porous membrane of the aromatic polyimide at an enhanced reproductivity, in spite of the fact that the conversion of the thin layer of the dope solution to the solid porous membrane is carried out simultaneously or partially simultaneously with the imidization of the polyamic acid.

Usually, the porous membrane of a polymer, which membrane is usable as a separator of a gas or liquid mixture, is produced in a wet process wherein a thin layer is formed from a dope solution of the polymer; the dope solution layer is coagulated by extracting the solvent from the dope solution with a coagulating liquid and then, the resultant coagulated membrane of the polymer is dried. Accordingly, it is difficult to recover the solvent from the coagulating liquid. In the process of the present invention, however, no coagulating liquid is necessary to produce the porous solid membrane of the aromatic polyimide, and it is easy to recover the solvent mixture from the porous membrane-producing process.

In the process of the present invention, not only a porous membrane in the form of a flat film, but also, a porous membrane in the form of a hollow filament or hollow tube, can be readily produced.

The porous membrane of the aromatic polyimide produced in accordance with the present invention exhibits an enhanced permeating rate of a gas or liquid substance and a separating property for a gas or liquid mixture and, therefore, is useful as a separator of the gas or liquid mixture and as a concentrator of the gas or liquid substance.

The porous membrane also exhibits excellent thermal resistance and resistance to chemicals and has satisfactory mechanical properties.

The polyamic acid usable for the process of the present invention is an aromatic polyamic acid which may also be referred to as an "aromatic polyamide acid", having a high molecular weight. The aromatic polyamic acid is prepared by polymerizing an aromatic tetracarboxylic acid component with an aromatic diamine component in a conventional manner, and is usable as a precursor of a corresponding aromatic polyimide.

The aromatic polyamic acid preferably contains, in the main chain thereof, at least 60 molar %, preferably at least 80 molar %, of at least one type of recurring unit of the formula (I):

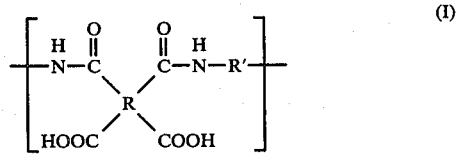

wherein R represents a tetravalent aromatic radical which may be a residue derived from an aromatic tetracarboxylic acid component, and R' represents a divalent aromatic radical which may be a residue derived from an aromatic diamine component.

The aromatic polyamic acid useful for the process of the present invention preferably has a logarithmic viscosity of from 0.1 to 7, more preferably, from 0.3 to 5, determined in a concentration of 0.5 g per 100 ml of N-methyl-2-pyrrolidone at a temperature of 30° C.

The aromatic polyamic acid may be one prepared by polymerizing a carboxylic acid component consisting of at least one aromatic tetracarboxylic acid compound with a diamine component consisting of at least one aromatic diamine compound in the medium of a polar organic solvent at a temperature of from approximately 0° C. to approximately 160° C., preferably, from 0° C. to 100° C., more preferably, from 0° C. to 80° C. In the preparation of the polyamic acid, the carboxylic acid component and the diamine component are preferably used in the substantially same molar amount to each other. The amount of either one of the two components may be about 5 molar % or less above the amount of the other component.

The aromatic tetracarboxylic acid compound may be selected from the group consisting of biphenyl tetracarboxylic acids, for example, 3,3',4,4'-biphenyl tetracarboxylic acid, 2,3,3',4'-biphenyl tetracarboxylic acid, and 2,2', 3,3'-biphenyl tetracarboxylic acid; benzophenone tetracarboxylic acids, for example, 3,3',4,4'-benzophenone tetracarboxylic acid, and 2,3,3',4'-benzophenone tetracarboxylic acid; 2,2-bis (3,4-dicarboxyphenyl) propane; bis (3,4-dicarboxyphenyl) methane; bis (3,4-dicarboxyphenyl) sulfone; bis (3,4-dicarboxyphenyl) ether; bis (3,4-dicarboxyphenyl) thioether; pyromellitic acid; and, anhydrides, salts and lower alcohol esters of the abovementioned acids.

The aromatic diamine compound may be selected from those of the formula H₂N-R'-NH₂, wherein R' is the same as defined above. It is preferable that the aromatic diamine compound be selected from the group consisting of those of the following formulae (II), (III), (IV) and (V):

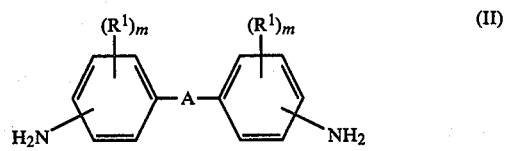

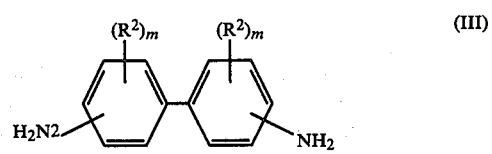

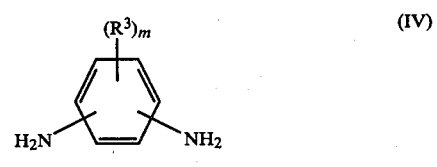

and

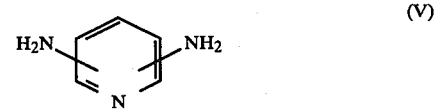

wherein $R^1$, $R^2$, and $R^3$ respectively represent, independently from each other, a member selected from the group consisting of hydrogen, lower alkyl radicals having 1 to 3 carbon atoms and lower alkoxyl radicals having 1 to 3 carbon atoms; A represents a divalent linking member selected from the class consisting of —O—, —S—, —CO—, —SO₂—, —SO—, —CH₂— and —C(CH₃)₂—; and m represents an integer of from 1 to 4.

Specific examples of the aromatic diamine usable for the process of the present invention are diamino-diphenyl ether compounds, for example, 4,4'-diaminodiphenyl ether, 3,3'-dimethyl-4,4'-diaminodiphenyl ether, 3,3'-diethoxy-4,4'-diaminodiphenyl ether and 3,3'-diaminodiphenyl ether; diaminodiphenyl thioether compounds, for example, 4,4'-diaminodiphenyl thioether, and 3,3'-diaminodiphenyl thioether; diaminodiphenyl methane compounds, for example, 4,4'-diaminodiphenyl methane and 3,3'-diaminodiphenyl methane; diaminobenzophenone compounds, for example, 4,4'-diaminobenzophenone, 3,3'-diaminobenzophenone and 3,3'-dimethyl-4,4'-diaminobenzophenone; diaminodiphenyl propane compounds, for example, 2,2-bis (4-aminophenyl) propane and 2,2-bis (3-aminophenyl) propane; 4,4'-diaminodiphenyl sulfoxide; 4,4'-diaminodiphenyl sulfone; benzidines; 3,3'-dimethyl benzidine; 3,3'-dimethoxy benzidine; o-, m- and p-phenylenediamines; diaminopyridine compounds; for example, 2,6-diaminopyridine and 3,6-diaminopyridine.

The polar organic solvent usable for the preparation of the aromatic polyamic acid may consist essentially of at least one member selected from the group consisting of N,N-dimethylformamide, N,N-dimethylacetamide, dimethyl sulfoxide, hexamethylphosphoric amide, N-methyl-2-pyrrolidone, pyridine, dimethyl sulfone, tetramethylene sulfone, and dimethyltetramethylene sulfone.

In the process of the present invention, the polyamic acid is uniformly dissolved to form a dope solution in a homogeneous solvent mixture consisting of (A) 100 parts by weight of a base solvent consisting essentially of at least one polar organic compound, which base solvent is capable of dissolving therein at least 5% by weight, preferably, at least 6% by weight, of the polyamic acid and of evaporating at a temperature of from 30° to 400° C., and (B) 5 to 150 parts by weight, preferably 10 to 140 parts by weight, of an additional solvent consisting essentially of at least one polar organic solvent, which additional solvent is capable of dissolving therein less than 3% by weight of the polyamic acid and evaporating at a lower evaporating rate than that of the above-mentioned base solvent at the above-mentioned evaporating temperature.

The base solvent usable for the process of the present invention may be the same as the polar organic solvent used in the preparation of the polyamic acid, N,N-dialkylcarboxylamides, for example, N,N-dimethylformamide and N,N-dimethylacetamide, and N-alkyl-2-pyrrolidones, for example, N-methyl-2-pyrrolidone and N-ethyl-2-pyrrolidone, are particularly preferable as the polar compounds for the base solvent.

As the additional liquid usable for the mixed solvent, there is used an organic polar solvent which is capable of dissolving less than 3% by weight, preferably less than 1.5% by weight, of the polyamic acid and of evaporating at a lower evaporating rate than that of the base solvent at a temperature of from 30° to 400° C. In addition, it is natural that the additional liquid should be compatible with the base solvent and incapable of dissolving therein the polyimide corresponding to the polyamic acid used.

The additional liquid may consist essentially of at least one polar aromatic compound which has a boiling point of at least 5° C., preferably, 10° to 200° C., above that of the base solvent, which is incapable of dissolving therein 3% by weight or more of the polyamic acid, and which is compatible with the base solvent. The additional liquid may consist essentially of at least one polar aromatic compound which has a boiling point in the range of from a temperature of 30° C. below the boiling point of the base solvent to a temperature of 5° C. above the boiling point of the base solvent, which has an ionization potential of at least 0.1 ev, preferably, at least 0.2 ev, below that of the base solvent, which is incapable of dissolving therein 3.0% by weight or more of the polyamic acid and which is compatible with the base solvent.

Examples of the organic compounds usable for the additional liquid are phenanthrene, o-terphenyl, p-terphenyl, α-chloronaphthalene, triphenylphosphine, triphenylamine, aniline, naphthalene, 1-methylnaphthalene, 2-methylnaphthalene, dimethylnaphthalene, anthracene and 1,2-benzanthracene.

The mixed solvent for the polyamic acid consists essentially of 100 parts by weight of the base having a high dissolving activity for the polyamic acid and 5 to 150 parts by weight of the additional liquid having a poor dissolving activity to the polyamic acid. The mixed solvent as a whole, must be able to uniformly dissolve therein the polyamic acid. Therefore, the amount of the additional liquid to be contained in the mixed solvent should be limited to an extent that the polyamic acid does not precipitate from the resultant dope solution.

In the dope solution of the present invention, the polyamic acid must be uniformly dissolved in a concentration of from 3 to 30% by weight, preferably, from 5 to 25% by weight, in the mixed solvent consisting essentially of the base solvent and the additional solvent.

The dope solution may be prepared by any conventional method. For example, the dope solution can be prepared in such a manner that: an aromatic tetracarboxylic acid component is polymerized with an aromatic diamine component in the medium of an organic polar solvent capable of dissolving the resultant polyamic acid, at a temperature of from about 0° to about 120° C. to prepare a solution containing the resultant aromatic polyamic acid, and; a necessary amount of the additional solvent is added to the resultant solution. In another process, the dope solution can be prepared in such a manner that: a large amount of an organic polar solvent, incapable of dissolving therein the polyamic acid, is added to the above-mentioned reaction mixture containing the polyamic acid to cause the polyamic acid to be precipitated; the resultant precipitate in the form of a powder is collected; and then, the powdery polyamic acid is uniformly dissolved in the above-mentioned mixed solvent.

It is preferable that the dope solution of the polyamic acid be a homogeneous liquid and exhibit a rotation viscosity of at least 500 centipoises, preferably, from 10 to 10,000 poises, at a thin layer-forming temperature.

In the process of the present invention, the dope solution is formed into a thin layer at a temperature of about 0° to about 120° C., preferably, from 30° to 110° C. The thin layer of the dope solution is heat-dried at a temperature of from about 30° to about 400° C., preferably, from 50° to 350° C., so as to gradually evaporate the mixed solvents while imidizing the polyamic acid into the corresponding aromatic polyimide.

In the process of the present invention, it is preferable that the dope solution be filtered and degassed at a temperature of from 20° to 120° C., preferably, from 30° to 110° C., before the thin layer-forming step.

In the process of the present invention, the thin layer of the dope solution may be produced and may be converted to a dry solid membrane by any conventional method. For example, a dope solution having the abovementioned composition, which has been filtered and degassed, is coated or spread on a smooth surface of a substrate at a temperature of from about 0° to about 120° C., preferably, from 30° to 110° C., so as to form a thin layer of the dope solution, having a weight of 10 to 5000 g/m². The thin layer of the dope solution is dried by gradually evaporating the mixed solvent at a temperature of from about 30° to about 400° C. while causing the amide-acid structure in the polyamic acid to be converted into cyclic imide structure, thereby producing a solidified porous aromatic polyimide membrane. Finally, the porous polyimide membrane is separated from the surface of the substrate.

The heating procedure may be carried out preferably, in two or more steps in such a manner that in the initial stage of the heating procedure, a major portion of the mixed solvent is gradually evaporated from the thin layer of the dope solution, and in the final stage, the polyamic acid contained in the dried thin layer is imidized.

That is, it is preferable that the thin layer of the dope solution be heated in the initial stage at a temperature of from about 30° to about 150° C. to evaporate the mixed solvent, and, in the final stage, at a temperature of from 150° to 400° C., to imidize the polyamic acid. In each heating procedure, the temperature may be gradually increased within the above-mentioned range. Alternatively, an increase in the temperature within the above-mentioned range may be carried out stepwise in two or more steps. The imidization procedure of the polyamic acid may be carried out in three steps, that is firstly at a temperature of from 150° to 250° C., secondly, at a temperature of 30° to 100° C. above the first temperature and finally at a temperature of 30° to 100° C. above the second temperature.

In the above-mentioned heating procedure, the heating time in each stage is variable depending on the type of the polyamic acid contained in the dope solution, the type of the base and additional solvents, the concentration of the polyamic acid in the dope solution and the heating temperature. Therefore, the heating time may be suitably determined in consideration of the above-mentioned variables. It is preferable that the resultant solid porous membrane have a thickness of from 5 to 500 microns and a weight of from 1 to 600 g/m².

The substrate having a smooth surface on which the dope solution is applied may include a glass plate, a copper plate, a steel plate, a metal plate plated with a suitable metal and a heat-resistant resin plate and; a metallic roll or belt having a smooth surface. It is necessary that the resultant solid membrane be readily separated from the smooth surface of the substrate.

In accordance with the process of the present invention, the porous membrane of the aromatic polyimide can be continuously produced in the following manner. A dope solution of a polyamic acid having a rotation viscosity of from about 500 to about 100,000 centipoises is extruded through a slit having a width of from about 0.1 to about 1 mm, toward a smooth peripheral surface of a rotating metallic drum or belt, at an extrusion temperature of from about 0° C. to about 120° C. The extruded stream of the dope solution is spread on the surface by its own spontaneous spreading property or by means of a doctor knife provided on the metallic roll or belt, so as to form a thin layer of the dope solution having a uniform thickness. Then, the thin layer formed on the rotating drum on belt surface is dried at a temperature of from about 30° to about 400° C. either by blowing a heated inert gas toward the thin layer or by applying thermic rays from an electric heater thereonto. This heating procedure causes the mixed solvent contained in the thin layer to be gradually evaporated while imidizing the polyamic acid contained in the thin layer, so as to provide a solid porous membrane of the resultant polyimide. Finally, the polyimide membrane is separated from the roll or belt surface. The separated porous membrane is preferably washed with methyl alcohol and/or acetone so as to completely remove the residual mixed solvent.

The process of the present invention is advantageous in that no coagulating liquid is used for producing the porous membrane of the polyimide. Also, it should be noted that the process of the present invention has made it possible for the first time to produce a porous membrane of a polyimide from a dope solution of the corresponding polyamic acid by a dry method in which no coagulating liquid is used.

According to the process of the present invention, the porous membrane of the aromatic polyimide can be stably produced in a continuous manner or an industrial scale by easy procedures.

The porous membrane of the aromatic polyimide prepared in accordance with the process of the present invention exhibits such an excellent heat resistance that the membrane can be used as a separator of a gas or liquid mixture at an elevated temperature of from about 50 to about 350° C. Furthermore, the porous membrane of the present invention exhibits a satisfactory gas- or liquid-permeating rate, a superior chemical-resistance property and excellent mechanical properties.

Therefore, the porous membrane of the present invention can be used as a separator of a gas or liquid mixture and as a concentrator of a gas or liquid. For example, the porous membrane of the present invention can be beneficially used for separating a hydrogen-carbon monoxide gas mixture and for concentrating the separated gases.

Examples of the present invention and comparative examples are illustrated below.

In the examples and comparative examples, the gas-permeability of the polyimide membrane was determined by the following gas-transmission test. In the test, membrane to be tested was placed in a stainless steel cell having a permeating area of 14.65 cm² and each of a hydrogen gas and a carbon monoxide gas was supplied to the cell under a pressure of 3.0 kg/cm²G. An amount (volume) of the gas passed through the membrane was measured by using a flow meter.

The gas-permeability (P) of each gas was calculated from the following equation:

$$\text{Gas-permeability } (P) \text{ (cm}^3\text{/cm}^2 \text{ sec cmHg)} = \frac{X}{A \times T \times D}$$

wherein X represents an amount (volume) in cm³ (STP) of the gas passed through the membrane, A represents a permeating surface area in cm² of the membrane through which the gas passed, T represents a transmission time in sec. of the gas through the membrane, and D represents a difference in pressure in cmHg between the gas-supply side and the opposite side of the membrane.

EXAMPLES 1 THROUGH 5

In each of Examples 1 through 5, a separable flask equipped with a stirrer and with a conduit for introducing thereinto nitrogen gas, was charged with 40 millimoles of 3,3',4,4'-biphenyl tetracarboxylic dianhydride (S-BPDA), 40 millimoles of 4,4'-diaminodiphenyl ether (DADE) and 178 g of N-methyl-2-pyrrolidone (NMP). The reaction mixture was subjected to a polymerization procedure at a temperature of 20° C. for five hours while flowing nitrogen gas through the conduit and the flask, to prepare a solution of a polyamic acid in NMP.

The resultant polyamic acid exhibited a logarithmic viscosity of 1.82 determined in a concentration of 0.5 g per 100 ml of NMP at a temperature of 30° C.

The resultant solution contained 10% by weight of the polyamic acid.

The solution was mixed with the additional solvent indicated in Table 1 in the amount indicated in Table 1 so as to prepare a homogeneous polyamic acid composition. The polyamic acid composition was filtered under pressure at ambient temperature. The filtered composition was degassed under reduced pressure to prepare a dope solution. The dope solution had a rotation viscosity of about 1000 centipoises at a temperature of 60° C.

The logarithmic viscosity of the polyamic acid was calculated in accordance with the following equation.

except that the additional solvent indicated in Table 1 was used in the amount indicated in Table 1.

The resultant polyimide membrane was subjected to the gas-transmission test. The results are shown in Table 1.

TABLE 1

| | Polyamic acid composition (dope solution) | | | | | | | |
|---|---|---|---|---|---|---|---|---|
| | Polyamic acid | | | | Base solvent | | | |
| Example No. | Monomer | Degree of imidization % | Logarithmic viscosity (30° C.) | Amount (g) | Type | Boiling point (°C.) | Ionization potential (ev) | Amount (g) |
| Example 1 | S—BPDA DADE | 1% or less | 1.82 | 10 | NMP | 202 | 9.1 | 90 |
| 2 | S—BPDA DADE | 1% or less | 1.82 | 10 | NMP | 202 | 9.1 | 90 |
| 3 | S—BPDA DADE | 1% or less | 1.82 | 10 | NMP | 202 | 9.1 | 90 |
| 4 | S—BPDA DADE | 1% or less | 1.82 | 10 | NMP | 202 | 9.1 | 90 |
| 5 | S—BPDA DADE | 1% or less | 1.82 | 10 | NMP | 202 | 9.1 | 90 |
| Comparative example 1 | S—BPDA DADE | 1% or less | 1.82 | 10 | NMP | 202 | 9.1 | 90 |
| 2 | S—BPDA DADE | 1% or less | 1.82 | 10 | NMP | 202 | 9.1 | 90 |
| 3 | S—BPDA DADE | 1% or less | 1.82 | 10 | NMP | 202 | 9.1 | 90 |

| | Polyamic acid composition (dope solution) | | | Gas transmission test | |
|---|---|---|---|---|---|
| | Additional solvent | | | Hydrogen | |
| Example No. | Type | Boiling point (°C.) | Ionization potential (ev) | Amount (g) | permeability ($PH_2$) $\left( \dfrac{cm^3}{cm^2 \cdot sec \cdot cmHg} \right)$ | Permeating rate ratio $PH_2/P_{CO}$ |
| Example 1 | Phenanthrene | 336 | 8.1 | 43 | $8.1 \times 10^{-3}$ | 2.7 |
| 2 | O—terphenyl | 212 | 8.1 | 43 | $1.4 \times 10^{-2}$ | 2.5 |
| 3 | α-chloro-naphthalene | 259 | 8.1 | 90 | $6.7 \times 10^{-4}$ | 2.8 |
| 4 | Phenol | 181 | 8.5 | 43 | $2.8 \times 10^{-3}$ | 3.1 |
| 5 | Diphenyl ether | 259 | 8.8 | 43 | $4.1 \times 10^{-5}$ | 2.6 |
| Comparative example 1 | O—dichloro-benzene | 181 | 9.1 | 43 | $7.3 \times 10^{-7}$ | 43 |
| 2 | Chlorobenzene | 132 | 9.1 | 43 | $8.8 \times 10^{-7}$ | 99 |
| 3 | Ethyl alcohol | 78 | 10.5 | 45 | $4.4 \times 10^{-7}$ | 65 |

$$\text{Logarithmic viscosity} = \frac{\text{natural logarithm}\left(\dfrac{\text{viscosity of solution}}{\text{viscosity of solvent}}\right)}{\text{concentration of polymer in solution}}$$

The dope solution was spread on a surface of a clean flat glass at a temperature of 60° C. by using a doctor blade to form a thin layer of the dope solution having a uniform thickness of 0.2 mm. The thin layer of the dope solution on the glass plate was heated at a temperature of 100° C. for 3 hours, and, then, at a temperature of 200° C. for 5 hours, to gradually evaporate the mixed solvent and to imidize the polyamic acid. Thus, a porous membrane of the resultant polyimide having a thickness of about 10 microns was obtained.

The resultant porous polyimide membrane was subjected to the gas-permeating test. The results of the test are shows in Table 1.

COMPARATIVE EXAMPLES 1 THROUGH 3

In each of Comparative Examples 1 through 3, a polyimide membrane was prepared in accordance with the same procedures as those described in Example 1, Each organic polar solvent per se, which was used as the additional solvent in the examples and the comparative examples, was substantially incapable of dissolving not only the aromatic polyamic acid powder (having a degree of imidization of 1% or less and a logarithmic viscosity of 1.82), but also, the resultant corresponding polyimide.

From the results of the above-mentioned examples and the comparative examples, it is apparent that in the case where an organic polar solvent having a much higher boiling point than that of the base solvent was used as the additional solvent, the resultant polyimide porous membrane exhibited excellent properties as shown in Examples 1, 2, 3 and 5. Also, it is evident that even when an organic polar solvent having a slightly lower boiling point than that of the base solvent was used as the additional solvent, as long as the ionization potential of the additional solvent was significantly lower than that of the base solvent, the resultant polyimide porous membrane exhibited excellent properties, as indicated in Example 4, because the additional solvent was evaporated at a lower evaporating rate than that of the base solvent during the heating procedure of the thin layer of the dope solution.

In contrast, when an organic polar solvent having a significantly lower boiling point than that of the base solvent was used as the additional solvent, as is shown in Comparative Examples 2 and 3, since the additional solvent was evaporated off at a higher evaporating rate than that of the base solvent, the resultant polyimide porous membrane exhibited a poor gas-permeating rate. That is, in this case, the gas-permeating rate of the resultant polyimide corresponded to that of the usual homogeneous non-porous membrane.

In addition, even when an organic polar solvent having a slightly lower boiling point than that of the base solvent was used as the additional solvent, when the ionization potential of the additional solvent was significantly higher than that of the base solvent, as is shown in Comparative Example 1, the resultant polyimide porous membrane exhibited an enhanced gas permeating rate, because the additional solvent was evaporated off more rapidly than the base solvent during the heating procedure of the thin layer of the dope solution. The polyimide membrane prepared in Comparative Example 1 rather exhibited a performance resembling that of the usual homogeneous non-porous membrane.

EXAMPLES 6 AND 7

In each of Examples 6 and 7, a polyamic acid was prepared in accordance with the same procedures as those described in Example 1, except that 3,3',4,4'-benzophenone tetracarboxylic acid dianhydride (BTDA) was used in place of the S-BPDA. The resultant polyamic acid exhibited a logarithmic viscosity of 1.62 determined in accordance with the same procedure as that described in Example 1.

The polyamic acid composition indicated in Table 2 was prepared in accordance with the same procedures as those described in Example 1, except that the additional solvent consisted of the compound indicated in Table 2. Then, the resultant polyamic acid composition (dope solution) was converted to a polyimide porous membrane in accordance with the same procedures as those described in Example 1.

The results of the gas-permeating test for the resultant polyimide porous membranes are shown in Table 2.

EXAMPLES 8 AND 9

In each of Examples 8 and 9, the same procedures as those described in Example 1 were carried out except that pyromellitic acid dianhydride (PMDA) was used in place of the S-BPDA, and the additional solvent consisted of the compound indicated in Table 2.

The results of the gas-permeating test for the resultant polyimide porous membranes are shown in Table 2.

EXAMPLES 10 AND 11

In each of Examples 10 and 11, the same procedures as those described in Example 1 were carried out, except that in place of the NMP, dimethylformamide (DMF) was used as the solvent for the polymerization reaction, and as the base solvent, and the additional solvent consisted of the compound indicated in Table 2.

The results of the gas-permeating test for the resultant polyimide porous membranes are shown in Table 2.

TABLE 2

| | Polyamic acid composition (dope solution) | | | | | | | |
|---|---|---|---|---|---|---|---|---|
| | Polyamic acid | | | | Base solvent | | | |
| Example No. | Monomer | Degree of imidization (%) | Logarithmic viscosity (30° C.) | Amount (g) | Type | Boiling point (°C.) | Ionization potential (ev) | Amount (g) |
| 6 | BTDA DADE | 1% or less | 1.62 | 10 | NMP | 202 | 9.1 | 90 |
| 7 | BTDA DADE | 1% or less | 1.62 | 10 | NMP | 202 | 9.1 | 90 |
| 8 | PMDA DADE | 1% or less | 1.38 | 10 | NMP | 202 | 9.1 | 90 |
| 9 | PMDA DADE | 1% or less | 1.38 | 10 | NMP | 202 | 9.1 | 90 |
| 10 | S—BPDA DADE | 1% or less | 1.90 | 10 | DMF | 153 | 9.1 | 90 |
| 11 | S—BPDA DADE | 1% or less | 1.90 | 10 | DMF | 153 | 9.1 | 90 |

| | Polyamic acid composition (dope solution) | | | Gas transmission test | |
|---|---|---|---|---|---|
| | Additional solvent | | | Hydrogen | |
| Example No. | Type | Boiling point (°C.) | Ionization potential (ev) | Amount (g) | permeability ($PH_2$) $\left(\dfrac{cm^3}{cm^2 \cdot sec \cdot cmHg}\right)$ | Permeating rate ratio $PH_2/P_{CO}$ |
| 6 | Phenanthrene | 336 | 8.1 | 43 | $9.0 \times 10^{-3}$ | 3.5 |
| 7 | O—terphenyl | 212 | 8.1 | 43 | $9.4 \times 10^{-2}$ | 2.5 |
| 8 | Phenanthrene | 336 | 8.1 | 43 | $4.2 \times 10^{-5}$ | 3.6 |
| 9 | O—terphenyl | 212 | 8.1 | 43 | $2.5 \times 10^{-2}$ | 2.4 |
| 10 | Phenanthrene | 336 | 8.1 | 43 | $7.1 \times 10^{-3}$ | 3.1 |
| 11 | O—terphenyl | 212 | 8.1 | 43 | $1.1 \times 10^{-2}$ | 2.9 |

In each of the above-mentioned Examples 6 through 11, the resultant dope solution was homogeneous and exhibited a rotation viscosity of approximately 1000 poises at a temperature of 60° C.

We claim:
1. A process for producing a porous aromatic polyimide membrane, comprising the steps of:
   (1) dissolving 3 to 30% by weight of an aromatic polyamic acid which has been prepared by the polymerization of at least one aromatic tetracarboxylic acid component with at least one aromatic diamine component, in 70 to 97% by weight of a solvent consisting essentially of a homogeneous mixture of:

(A) 100 parts by weight of a base solvent consisting essentially of at least one polar organic compound which base solvent is capable of dissolving therein said polyamic acid in a concentration of at least 5% by weight therein, and of evaporating at a temperature of from 30' to 400° C. and (B) 5 to 150 parts by weight of an additional liquid consisting essentially of at least one polar organic compound, which additional liquid is capable of dissolving therein not more than 3% by weight of said polyamic acid and is capable of evaporating at a smaller evaporating rate than that of said base solvent at the above-mentioned evaporating temperature, to provide a dope solution;

(2) forming a thin layer of said dope solution at a temperature of from 0° to 120° C.; and (3) heating said thin layer of said dope solution at a temperature of from 30° to 400° C., whereby said mixed solvent is gradually evaporated off from said thin layer of said dope solution and said polyamic acid is imidized to a corresponding polyimide, to form a porous membrane of said polyimide.

2. The process as claimed in claim 1, wherein said polyamic acid contains at least 60 molar % of at least one recurring unit of the formula (I):

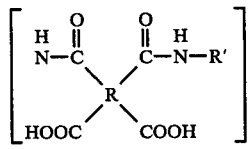

wherein R represents a tetravalent aromatic radical and R' represents a divalent aromatic radical.

3. The process as claimed in claim 2, wherein said polyamic acid exhibits a logarithmic viscosity of from 0.1 to 7, which has been determined at a concentration of 0.5 g per 100 ml of N-methyl-2-pyrrolidone at a temperature of 30° C.

4. The process as claimed in claim 1, wherein said polyamic acid is one prepared by polymerizing a carboxylic acid component consisting essentially of at least one aromatic tetracarboxylic acid compound with a diamine component consisting essentially of at least one aromatic diamine compound at a temperature of from approximately 0° C. to approximately 160° C. in a polar organic solvent.

5. The process as claimed in claim 4, wherein said aromatic tetracarboxylic acid component is selected from the group consisting of biphenyl tetracarboxylic acids, benzophenone tetracarboxylic acids, 2,2-bis (dicarboxyphenyl) propane, bis (3,4-dicarboxyphenyl) methane, bis (3,4-dicarboxyphenyl) sulfone, bis (3,4-dicarboxyphenyl) ether, bis (3,4-dicarboxyphenyl) thioether, pyromellitic acid, and acid anhydrides, salts and lower alcohole esters of the above-mentioned acids.

6. The process as claimed in claim 4, wherein said aromatic diamine compound is selected from the group consisting of those of the formulae (II) through (V)

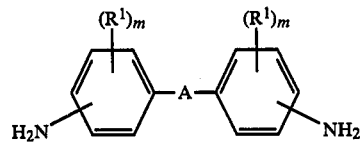

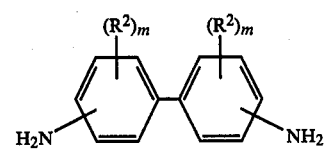

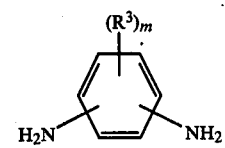

and

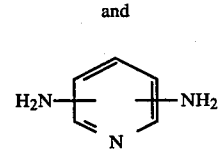

wherein $R^1$, $R^2$ and $R^3$ respectively represent, independently from each other, a member selected from the group consisting of hydrogen atom, lower alkyl radicals having 1 to 3 carbon atoms and lower alkoxyl radicals having 1 to 3 carbon atoms; A represents a divalent linking member selected from the class consisting of —O—, —S—, —CO—, —SO$_2$—, —SO—, —CH$_2$— and —C(CH$_3$)$_2$—; and m represents an integer of from 1 to 4.

7. The process as claimed in claim 1, wherein said base solvent consists essentially of at least one member selected from the group consisting of N,N-dimethylformamide, N,N-dimethylacetamide, dimethylsulfoxide, hexamethylphosphoric amide, N-methyl-2-pyrrolidone, pyridine, dimethylsulfone, tetramethylenesulfone and dimethyltetramethylenesulfone.

8. The process as claimed in claim 1, wherein said additional liquid consists of at least one member selected from the group consisting essentially of phenanthrene, o-terphenyl, p-terphenyl, α-chloronaphthalene, triphenylphospine, triphenylamine, aniline, naphthalene, 1-methylnaphthalene, 2-methylnaphthalene, dimethylnaphthalene, anthracene, and 1,2-benzanthracene.

9. The process as claimed in claim 1, wherein said dope solution exhibits a rotation viscosity of at least 500 centipoises at the thin layer-forming temperature.

10. The process as claimed in claim 1, wherein said heating procedure is carried out at a temperature of from 30° to 150° C. to evaporate a portion of said solvent and, then, at a temperature of from 150° to 400° C. to additionally evaporate the remaining portion of said solvent and to imidize said polyamic acid.

11. The process as claimed in claim 10, wherein said additional evaporating-imidizing procedure is carried out firstly at a temperature of from 150° to 250° C., secondly, at a temperature of from 30° to 100° C. above the first temperature and, finally, at a temperature of from 30° to 100° C. above the second temperature.

12. A porous membrane of an aromatic polyimide, prepared by the process as claimed in claim 1.

* * * * *